Aug. 24, 1948.  L. JAROSH  2,447,579
RAKE CLEANING ATTACHMENT
Filed March 8, 1945
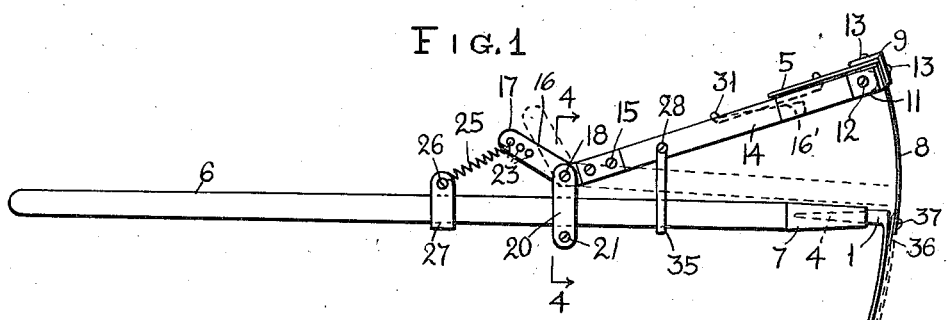
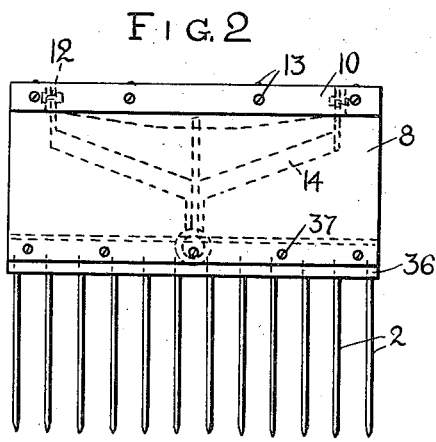
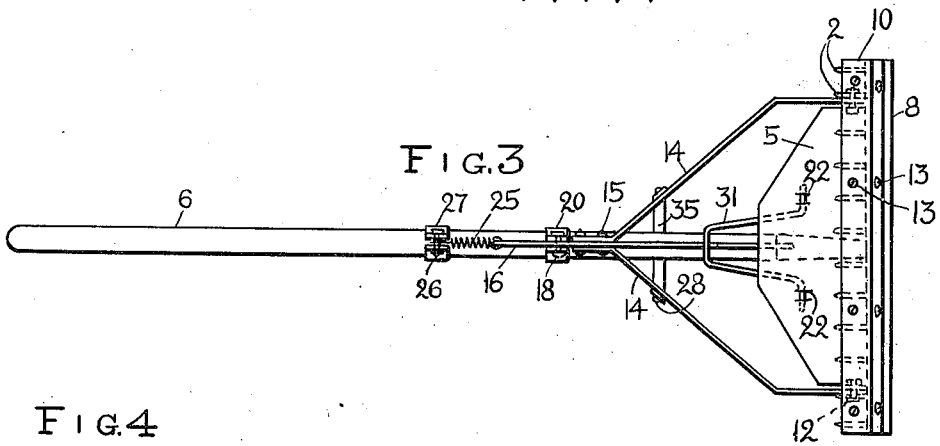
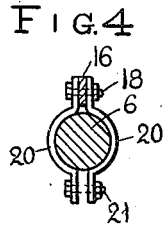
LOUIS JAROSH
INVENTOR.
BY John P. Nikonow
ATTORNEY Patented Aug. 24, 1948

2,447,579

UNITED STATES PATENT OFFICE 2,447,579

RAKE CLEANING ATTACHMENT

Louis Jarosh, Brooklyn, N. Y.

Application March 8, 1945, Serial No. 581,595

4 Claims. (Cl. 56—400.08)

My invention relates to garden rake cleaning attachments and has particular reference to rakes for gathering matter from the ground.

Ordinary garden rakes have a disadvantage in that the leaves and similar matter have a tendency to stick to the tines or prongs of the rake so that it is necessary frequently to stop the work for manually cleaning the tines from matter.

My invention has for its object to provide a simple attachment for an ordinary rake for removing any matter from the tines, the attachment being so arranged that for cleaning the tines it is only necessary to turn the rake over and to strike the ground with the back side of the tines, and it is not necessary to manually operate any levers or similar mechanism for removing the matter from the tines.

Another object of my invention is to provide an attachment with a reinforced bar for scraping and leveling the ground.

My invention is more fully described in the accompanying specification and drawing in which:

Fig. 1 is an elevational view of a rake with my cleaning attachment shown in an inoperative position, the operative position being shown in dotted lines;

Fig. 2 is a front view of a rake with my attachment;

Fig. 3 is a top plan view of the same; and

Fig. 4 is a sectional detail view taken on the line 4—4 of Fig. 1.

My cleaning attachment comprises a curved metal sheet or plate 8, the curvature of the plate approximately conforming to the curvature of tines 2, the tines extending from a bar 1 of a rake. The upper portion of the plate 8 is bent at right angles at 9, forming a rear extension or shelf 5. The corner 9 of the plate is placed inside a piece 10 of angle iron to which the plate and the extension 5 are attached by screws or bolts 13. Brackets 11 are fastened to the bar 10 and are provided with holes for bolts 12 forming pivotal supports for the ends of metal bars 14. The rear extension 5 is relatively narrow and fits between the ends of the bars 14 as shown, allowing free rotation of the plates 8 and 5 on the pivots 12. The bars 14 are bent towards a handle 6 of the rake and are secured by bolts or screws 15 to a central bar 16, the three bars forming a rigid frame. The bar 16 is provided with a hole for a bolt 18 passing through the sides of clamping plates 20, fastened to the handle 6 by bolts 21 and 18 as shown in detail in Fig. 4. The rear portion 17 of the bar 16 is bent upwards and is provided with holes 23 for the end of a spring 25, there being several holes for adjusting the spring tension. The other end of the spring is fastened to a bolt 26 which also holds a clamp 27 on the handle 6. The central bar 16 extends for a certain distance under the rear plate 5 and is tapered or undercut at its upper edge 16' to allow a certain limited amount of the rotary movement for the plate 5 on the pivots 12. The scraping plate 8 is urged against tines by a U-shaped spring 31, the bight of the U-portion of the spring resting on top of the bar 16. The ends of the spring are bent outwards and are inserted in slots 22 in the plate 5.

The spring 31 therefore urges the lower edge of the scraping plate 8 into engagement with the outer sides of the tines. To protect the edge of the plate 8 against wear, a metal blade 36 is detachably fastened to the lower edge of the plate 8 by screws or bolts 37 so that the blade, when worn out at one edge, can be removed and turned over for exposing the other edge to the wear.

For cleaning the rake from the accumulated matter it is only necessary to turn the rake over to press it against the ground, causing the bar 10 to move towards the bar 1 and removing the matter by the blade 36. I have found that the matter is very effectively removed by such scraping of the outer sides of the tines.

To prevent any excessive outward movement of the scraping plate, a strap 35 is provided, encircling the handle 6 and fastened at the ends to the metal bars 14 as by a bolt or screw 28.

My rake cleaning attachment can be easily taken apart and again assembled since all its principal parts are joined together by screws or bolts.

While the invention has been described in detail with respect to certain particular preferred examples, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent is:

1. A rake comprising an elongated handle; a middle bar; means to pivotally support the rear portion of the middle bar on the handle; a spring urging the front portion of the bar upward; means to limit the upward movement of the middle bar; a cross-bar secured to the front end of the handle; a plurality of arcuate tines extending downward from the cross-bar; side bars secured at the rear ends to the middle bar in front of the pivoting means, the side bars diverging from the middle bar; a scraping plate pivotally connected at the upper portion thereof to the front ends of the side bars and extending downward therefrom; and resilient means to rotate the scraping plate toward the tines, the middle bar together with the side bars being adapted to be manually rotated for causing the lower edge portion of the scraping plate to slide downward in yieldable engagement with the outer sides of the tines.

2. A rake comprising an elongated handle; a middle bar; means to pivotally support the rear portion of the middle bar on the handle; a spring urging the front portion of the bar upward; means to limit the upward movement of the middle bar; a cross-bar secured at the front end of the handle; a plurality of arcuate tines extending downward from the cross-bar; side bars secured at the rear ends to the middle bar in front of the pivoting means, the side bars diverging from the middle bar; a scraping member pivotally connected at the upper portion thereof to the front ends of the side bars and extending downward therefrom, the scraping member being curved approximately concentrically to the curvature of the tines; resilient means to rotate the scraping member toward the tines, the middle bar together with the side bars being adapted to be manually rotated for causing the lower edge portion of the scraping member to slide downward in yieldable engagement with the outer sides of the tines; and a scraping blade removably attached to the lower edge of the scraping member.

3. A rake comprising an elongated handle; a middle bar; means to pivotally support the rear portion of the middle bar on the handle; a spring urging the front portion of the bar upward; means to limit the upward movement of the middle bar; a cross-bar secured at the front end of the handle; a plurality of arcuate tines extending downward from the cross-bar, the centers of the curvature of the tines being located approximately on the line passing through the pivoting means of the central bar; side bars secured at the rear ends to the middle bar in front of the pivoting means, the bars diverging outward from the middle bar; a scraping plate pivotally connected at the upper portion to the front ends of the side bars and extending downward therefrom to the lower edge portion of the plate extending below the cross-bar; an angular rearward extension at the upper end of the scraping plate; a spring interposed between the middle bar and the angular extension urging the angular extension upward, thereby causing the lower edge portion of the scraping plate to engage the outer sides of the tines, the front end of the middle bar extending under the angular extension for limiting the rotary movement of the scraping plate, the middle bar with the side bars and the scraping plate being adapted to be manually rotated for causing the lower edge of the scraping bar to slide downward over the outer curved surfaces of the tines.

4. A rake comprising an elongated handle; a middle bar; means to pivotally support the rear portion of the middle bar on the handle; a spring supported above the handle and urging the front portion of the bar upward; means to limit the upward movement of the middle bar; a cross-bar secured at the front end of the handle; a plurality of curved tines extending downward from the cross-bar; side bars secured at the rear ends to the middle bar in front of the pivoting means, the side bars diverging from the middle bar; a scraping plate pivotally connected at the upper portion to the front ends of the side bars and extending downward therefrom; and resilient means to rotate the scraping plate on the side bars toward the tines, the central bar together with the side bars being adapted to be manually rotated for causing the lower edge portion of the scraping plate to slide downward in yieldable engagement with the outer sides of the tines.

LOUIS JAROSH.

REFERENCES CITED

The following references are of record in the file of this patent:

UNITED STATES PATENTS

| Number | Name | Date |
|---|---|---|
| 905,808 | Fruecht et al. | Dec. 1, 1908 |
| 1,084,982 | Zandt | Jan. 20, 1914 |
| 1,158,640 | Clute | Nov. 2, 1915 |
| 1,647,077 | Brown | Oct. 25, 1927 |
| 1,786,770 | Myers | Dec. 30, 1930 |